United States Patent
Sturges

(10) Patent No.: US 9,130,923 B2
(45) Date of Patent: Sep. 8, 2015

(54) CREDENTIAL PROVIDER THAT ENCAPSULATES OTHER CREDENTIAL PROVIDERS

(71) Applicant: McAfee, Inc., Santa Clara, CA (US)

(72) Inventor: Philip Sturges, Worthing (GB)

(73) Assignee: McAfee, Inc.

(*) Notice: Subject to any disclaimer, the term of this patent is extended or adjusted under 35 U.S.C. 154(b) by 105 days.

(21) Appl. No.: 14/084,853

(22) Filed: Nov. 20, 2013

(65) Prior Publication Data

US 2014/0082711 A1    Mar. 20, 2014

Related U.S. Application Data

(63) Continuation of application No. 13/223,064, filed on Aug. 31, 2011, now Pat. No. 8,621,584.

(51) Int. Cl.
*G06F 21/31* (2013.01)
*H04L 29/06* (2006.01)
*G06F 21/33* (2013.01)
*G06F 21/57* (2013.01)

(52) U.S. Cl.
CPC ............. *H04L 63/08* (2013.01); *G06F 21/31* (2013.01); *G06F 21/33* (2013.01); *G06F 21/575* (2013.01); *G06F 2221/2117* (2013.01); *G06F 2221/2153* (2013.01)

(58) Field of Classification Search
None
See application file for complete search history.

(56) References Cited

U.S. PATENT DOCUMENTS

| | | |
|---|---|---|
| 5,655,077 A | 8/1997 | Jones et al. |
| 5,774,551 A | 6/1998 | Wu et al. |
| 7,194,764 B2 | 3/2007 | Martherus et al. |
| 7,571,467 B1 | 8/2009 | Priesteley et al. |
| 7,810,143 B2 | 10/2010 | Ruzyski et al. |
| 2002/0112062 A1* | 8/2002 | Brown et al. ............ 709/229 |
| 2002/0112155 A1 | 8/2002 | Martherus et al. |

(Continued)

FOREIGN PATENT DOCUMENTS

| | | |
|---|---|---|
| WO | 2013033072 A2 | 3/2013 |
| WO | 2013/033072 A3 | 4/2013 |

OTHER PUBLICATIONS

International Preliminary Report on Patentability received for PCT Patent Application No. PCT/US2012/052626 mailed on Mar. 13, 2014, 7 pages.
Office Action received for U.S. Appl. No. 13/223,064, mailed on Feb. 25, 2013, 20 pages.

(Continued)

*Primary Examiner* — Andrew Nalven
*Assistant Examiner* — Huan V Doan
(74) *Attorney, Agent, or Firm* — Blank Rome LLP.

(57) ABSTRACT

Systems, methods, and computer readable media for encapsulating multiple Windows® based credential providers (CPs) within a single wrapping CP are described. In general, CP credentials and fields from two or more encapsulated or wrapped CPs may be enumerated and aggregated in such a way that the order of fields from each CP is preserved, fields that may be used only once are identified and appear only once, and fields are given a new unique field identifier. The union of all such fields (minus duplicates of any one-use-only fields) may be used to generate a mapping so that the wrapping CP and CP credential may "pass-through" calls from the operating system's logon interface to the correct wrapped CP and CP credential. The disclosed techniques may be used, for example, to provide single sign-on functionality where a plurality of sign-on credentials may be used (e.g., user name/password and smart card PIN).

21 Claims, 6 Drawing Sheets

(56) References Cited

U.S. PATENT DOCUMENTS

| | | | |
|---|---|---|---|
| 2005/0091213 A1* | 4/2005 | Schutz et al. | 707/9 |
| 2006/0242427 A1* | 10/2006 | Ruzyski et al. | 713/186 |
| 2007/0274315 A1 | 11/2007 | Keith | |
| 2008/0115208 A1* | 5/2008 | Lee | 726/19 |
| 2008/0196090 A1 | 8/2008 | Baron et al. | |
| 2010/0132019 A1* | 5/2010 | Hardt | 726/6 |
| 2011/0124335 A1* | 5/2011 | Martin et al. | 455/434 |
| 2013/0055365 A1 | 2/2013 | Sturges | |

OTHER PUBLICATIONS

Notice of allowance received for U.S. Appl. No. 13/223,064, mailed on Aug. 21, 2013, 12 pages.

International Search Report received for PCT Application No. PCT/US2012/052626, mailed on Feb. 22, 2013, 4 pages.

Upadhyay, et al., "Single Sign-on Using Kerberos in Java", Sun Microsystems, Inc., Dec. 19, 2013, 11 pages. Webpage available at: <http://docs.oracle.com/javase/6/docs/technotes/guides/security/jgss/single-signon.html>.

* cited by examiner

CREDENTIAL PROVIDER THAT ENCAPSULATES OTHER CREDENTIAL PROVIDERS

BACKGROUND

This disclosure relates generally to the field of automated login processes. More particularly, but not by way of limitation, it relates to a technique for wrapping multiple credential providers within a common credential provider object.

During computer system startup using the Microsoft Windows XP® or Windows Server® 2003 operating systems, the Winlogon executable loads and executes a Graphical Identification and Authentication (GINA) dynamic-link library (DLL). (WINDOWS XP and WINDOWS SERVER are registered trademarks of the Microsoft Corporation.) Once loaded, the GINA provides customizable user identification and authentication procedures and is responsible for rendering the graphical aspect of the logon operation/process.

Using GINAs, software developers are able to customize the logon process user-experience by ensuring their custom GINA is loaded and executed before that of other GINAs. Software developers are also able to "reuse" the functionality of previously developed logon functionality by utilizing a technique known as "GINA chaining." GINA chaining is possible because there is a first or "head" GINA that must be invoked and through which all other GINAs may be provided; chained GINAs form a hierarchical structure.

Beginning in Windows Vista®, the LogonUI process became responsible for rendering the graphical aspect of the logon window while the overall logon process is mediated through the use of credential providers (CPs). (WINDOWS VISTA is a registered trademark of the Microsoft Corporation.) To deliver the functionality provided by GINA chaining in this new environment, there needs to be a "head" CP. However, the logon architecture of Windows Vista and Windows 7 is such that all registered CPs are peers of one another; there is no "head" CP which must be invoked and through which communication to other CPs may be passed. Microsoft provides guidance on how one CP can invoke and reuse/extend the functionality of exactly one other CP in a process termed "wrapping." That is, Microsoft permits the encapsulation or wrapping of only one CP. Therefore, even if just one CP was allowed to be active at logon (so it must be used)—it could only be the head CP to one other CP. In such a setting the full functionality of GINA chaining is not possible. Given this, it would be beneficial to provide a mechanism that allows one CP to simultaneously encapsulate or wrap two or more other CPs.

SUMMARY

In one embodiment a method to control the user experience during computer logon operations is provided. The method includes creating (e.g., instantiating) a wrapping credential provider that in turn creates multiple credential providers, wherein each credential provider has a specified number of credentials and an ordered list of fields. In addition, each field has a credential provider specific identifier and descriptor. Once, or during, credential provider creation each credential provider may be assigned or obtain a unique provider index. A map list may then be generated based on the ordered lists of fields from each credential provider, wherein the order of fields from a single credential provide is preserved in the map list. One-use-only fields are identified in the map list and a unique identifier is assigned to the first instance of each one-use-only field, each subsequent instance of a one-use-only field is assigned the identifier given to the first instance of the same one-use-only field. The described methods may also provide a logon interface process (e.g., the Windows LogonUI process) with sufficient information that the logon interface process can display multiple tiles in a single window on a display device, wherein each of the multiple wrapped credential providers supports at least one of the displayed tiles. In another embodiment a computer executable program to implement the described methods may be stored in any non-transitory media that is readable and executable by a computer processor. Further, such a computer processor and computer executable program may be embodied in a computer system. Such a computer system may be a stand-alone system or it may be coupled to a communications network.

DETAILED DESCRIPTION

Figure 1A:
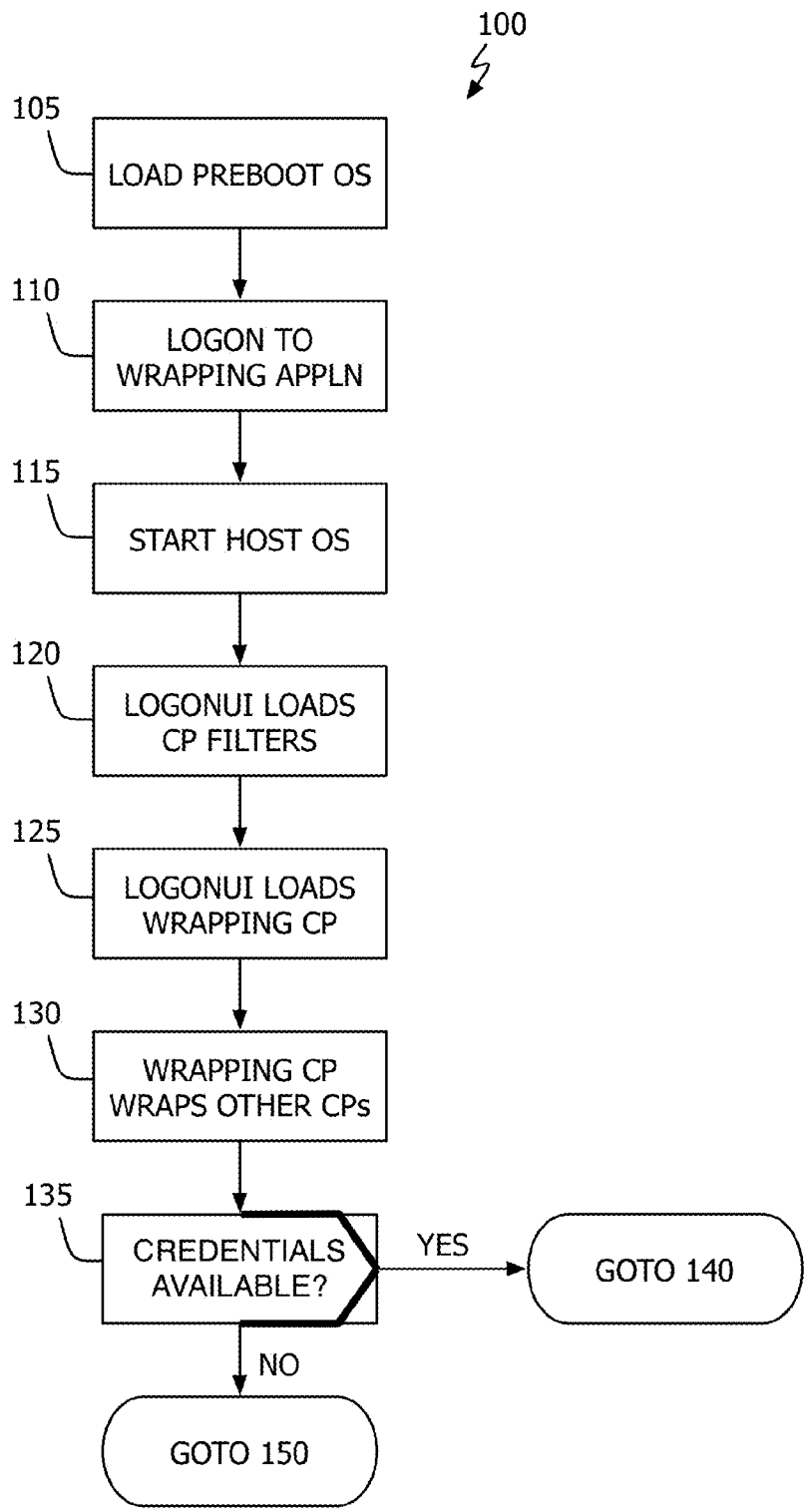
FIGS. 1A and 1B show, in flowchart form, a single sign-on operation in accordance with one embodiment.

This disclosure pertains to systems, methods, and computer readable media for wrapping, or functionally encapsulating, multiple Windows® based credential providers (CPs) within a single "wrapping" CP object. (WINDOWS is a registered trademark of the Microsoft Corporation.) In general, techniques are disclosed wherein a single CP object instance identifies, enumerates and classifies fields from two or more other CPs so that each of these "wrapped" CP's credentials "belong to" and can be controlled by the wrapping CP and may be displayed in a common display window and selected by a user in a manner consistent with their "unwrapped" operation. More particularly, fields from two or more CPs may be enumerated and those fields that may be used only once identified. The union of all such fields (minus duplicates of those fields that may be used only once) may be used to generate a mapping so that the wrapping CP may "pass-through" calls from, for example, an operating system's logon interface to the correct wrapped CP (e.g., LogonUI in Windows Vista and Windows 7). As used herein, the phrases "wrapping CP" or "wrapper CP" refer to the credential provider that is incorporating the functionality of two or more other credential providers. Similarly, the phrase "wrapped CP" refers to a CP whose functionality has been incorporated within the wrapping CP.

Another approach to providing multiple CP functionality within a single CP, an approach adopted by some providers of single sign-on (SSO) capability, is the creation of a single CP (an über alles CP) that encodes the functionality of all the target CPs. Implementations taking this approach must generally "reverse engineer" the behavior of each CP whose capability is to be incorporated within the über alles CP (e.g., the Microsoft smart-card CP). Not only is this a difficult task, it is one that is challenging to maintain from a software management point of view. The task of reverse engineering an existing CP may be especially difficult as a single CP can supply multiple heterogeneous credentials and control when they are shown. The approach described herein avoids these difficulties.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. As such, it should be understood that references to numbered drawing elements without associated identifiers (e.g., 900) refer to all instances of the drawing element with identifiers (e.g., 900a and 900b). Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the computer data protection field having the benefit of this disclosure.

Embodiments of the disclosed systems, methods, and computer readable media will be described herein as they may be used to provide SSO capability for the Windows Vista and Windows 7 operating systems (OS). For instance, to implement SSO functionality password and smart-card CPs may be wrapped. In another embodiment, SSO functionality may also include use of a fingerprint CP. In some embodiments the CPs to be wrapped may be determined statically (e.g., through user settings or system files such as, for example, the Windows registry file). In other embodiments, identification of the wrapped CPs may be determined dynamically (i.e., at run-time). In still other embodiments, some of the wrapped CPs may be determined statically and others may be determined dynamically.

By way of example, the following description teaches incorporating CP wrapping techniques into the Endpoint Encryption product from McAfee, Inc. (In general, the McAfee Endpoint Encryption product provides full disk encryption and data protection using a pre-boot authentication process.) Another illustrative use could be to use the disclosed techniques for product "branding" by putting images over existing, for example, credentials for a specific credential provider. In yet another embodiment, the Windows credentials available with which to logon may be restricted based on, for example, the time of day, a system policy, or who has logged onto the system using a "first" credential.

Referring to FIG. 1A, SSO system startup operation 100 in accordance with one embodiment may begin when a computer system's preboot OS is loaded (block 105). As well be recognized by those of skill in the art, a preboot environment may be provided by a computer system's BIOS or boot firmware to provide a secure environment external to the computer system's operating system. During preboot, a user may logon to an application (e.g., Endpoint Encryption) on the target system that utilizes the wrapping techniques described herein (block 110). With preboot complete, the Windows OS may be started (block 115). During Windows startup, the LogonUI process loads a number of CP filters—typically one for each registered CP (block 120). In Windows Vista and Windows 7 the LogonUI process implements the graphical user interface that is shown when a user is asked to logon to a local machine. The filter associated with the wrapping CP may be configured such that it blocks the loading of all CPs except the wrapping CP (block 125). Once loaded, the wrapping CP loads two or more other CPs (block 130). In one implementation, a list of CPs to wrap may be provided along with the identifiers of the fields to use for the SSO "secret" (e.g., password and PIN field identifiers in the password and smart card CPs respectively). Another implementation could dynamically discover the CPs to wrap (e.g., at run-time through ".ini" or system registry files). If the user's logon credentials (e.g., password or smart-card PIN) are known (the "YES" prong of block 135), operation 100 continues at block 140 in FIG. 1B. If the user's credentials are not available (the "NO" prong of block 135), operation 100 continues at block 150 in FIG. 1B.

Figure 1B:
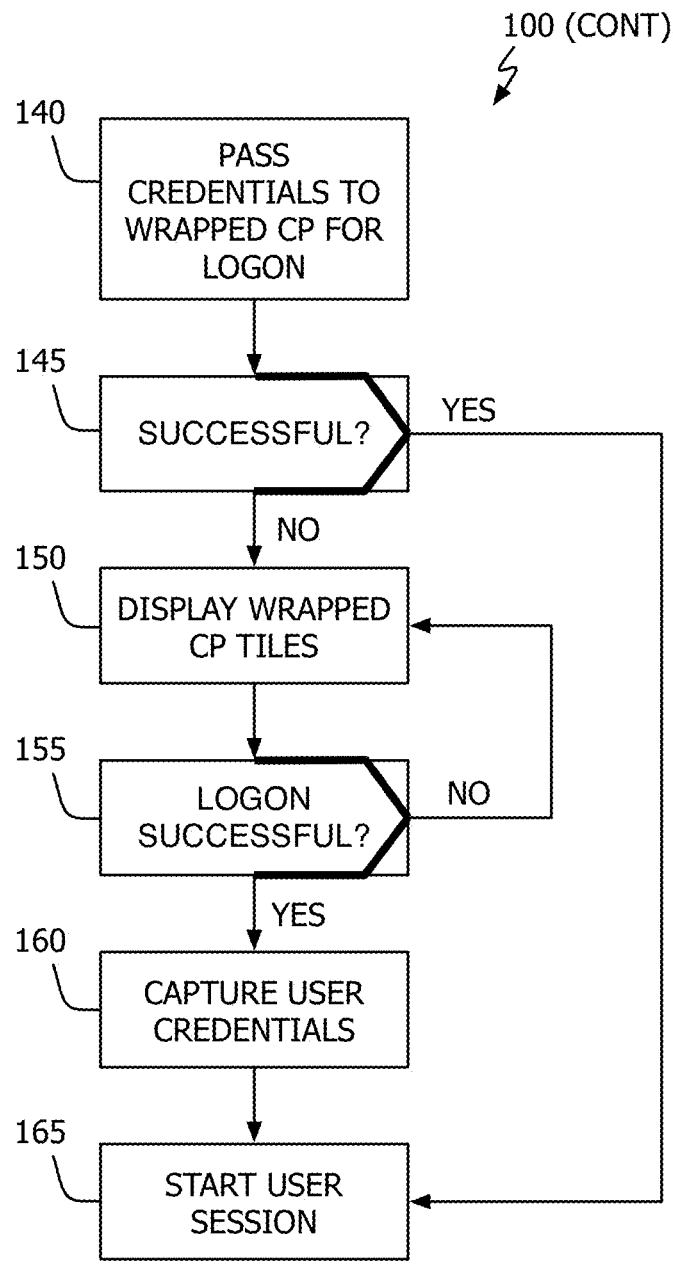

Referring now to FIG. 1B, where credentials are available the wrapping CP passes those credentials to a wrapped CP and requests it log the user on using those credentials (block 140). The receiving/wrapped CP executes as normal to accomplish the requested task. If the logon is successful (the "YES" prong of block 145), operation 100 continues at block 165 (discussed below). If the logon was unsuccessful (the "NO" prong of block 145), the LogonUI process displays the wrapped CPs' tiles (block 150). The term "tile" is used in its customary sense, and refers to a visual representation of a credential and generally appears as an icon or small image within the LogonUI window. In the Windows environment, each tile/credential is backed by a CP credential object, has been created by a CP, and implements the ICredentialProviderCredential interface. It is noted that one CP may create multiple tiles.)

Tiles may be selected by a user which then causes the tile's associated CP to be invoked. If the user, after selecting one of the displayed tiles, fails to successfully logon (the "NO" prong of block 155), operation 100 returns to block 150. If the user successfully logs onto the target system (the "YES" prong of block 155), the user's "secret" is captured and stored in a secure manner (block 160). In one embodiment, a user's secret could be their username and password. In another embodiment, a user's secret could be a smartcard's PIN identifier. For example, the user's name and/or password may be stored in an encrypted form within the McAfee Endpoint Encryption application. Following a successful logon, the user's session is started in the host operating system (block 165).

It will be recognized that SSO operation 100 provides an automated logon to Windows, but does not remove the requirement that a user initially logon to the wrapping application as noted in block 110. In the context of operation 100, the user experience is that once they successfully logon to the application loaded during preboot (e.g., Endpoint Encryption), that application passes their logon credentials to the Windows OS during startup—the result is that the user is automatically logged into Windows.

Figure 2:
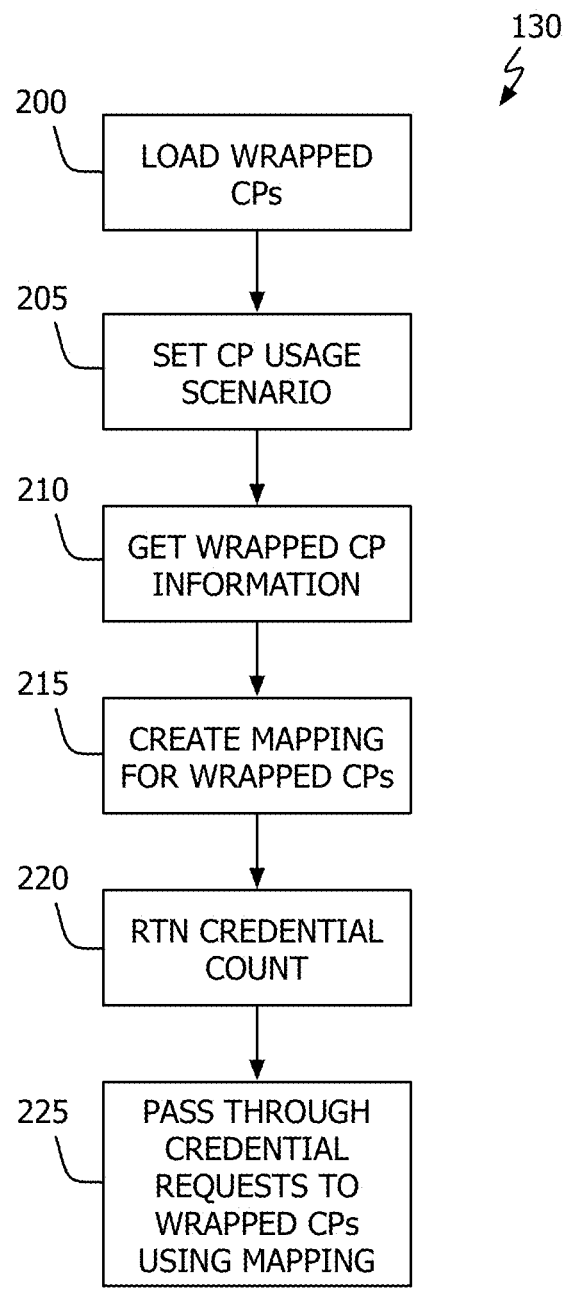
FIG. 2 shows, in flowchart form, a credential provider wrapping operation in accordance with one embodiment.

Referring to FIG. 2, wrapping operation in accordance with block 130 begins by loading those CPs identified for wrapping (block 200). For example, in a Windows environment, acts in accordance with block 200 create a collection of wrapped CP COM objects. Once loaded the usage scenario for the wrapped CPs may be set to, for example, logon or unlock (block 205). The wrapping CP may then query each wrapped CP to obtain the number of credentials and fields associated with each (block 210). As discussed in more detail below, the wrapping CP uses this information to generate one or more mapping tables (block 215). When asked, the wrapping CP passes the total credential count to the LogonUI process (block 220). In practice, each wrapped CP generates its own credential(s), passing them back to the wrapping CP. The wrapping CP then returns each credential to the LogonUI process. This information allows LogonUI to display the wrapped CPs' credentials as though the wrapped CPs were actually active (i.e., not wrapped).

The wrapping CP uses the mapping information generated in accordance with block 215 to act as a middleman between the LogonUI process and each of the wrapped CPs (block 225). That is, when a user selects a displayed tile in the displayed logon window, the wrapping CP uses one or more mapping tables (or lists) so that the user's action may be forwarded to the proper wrapped CP.

Figure 3:
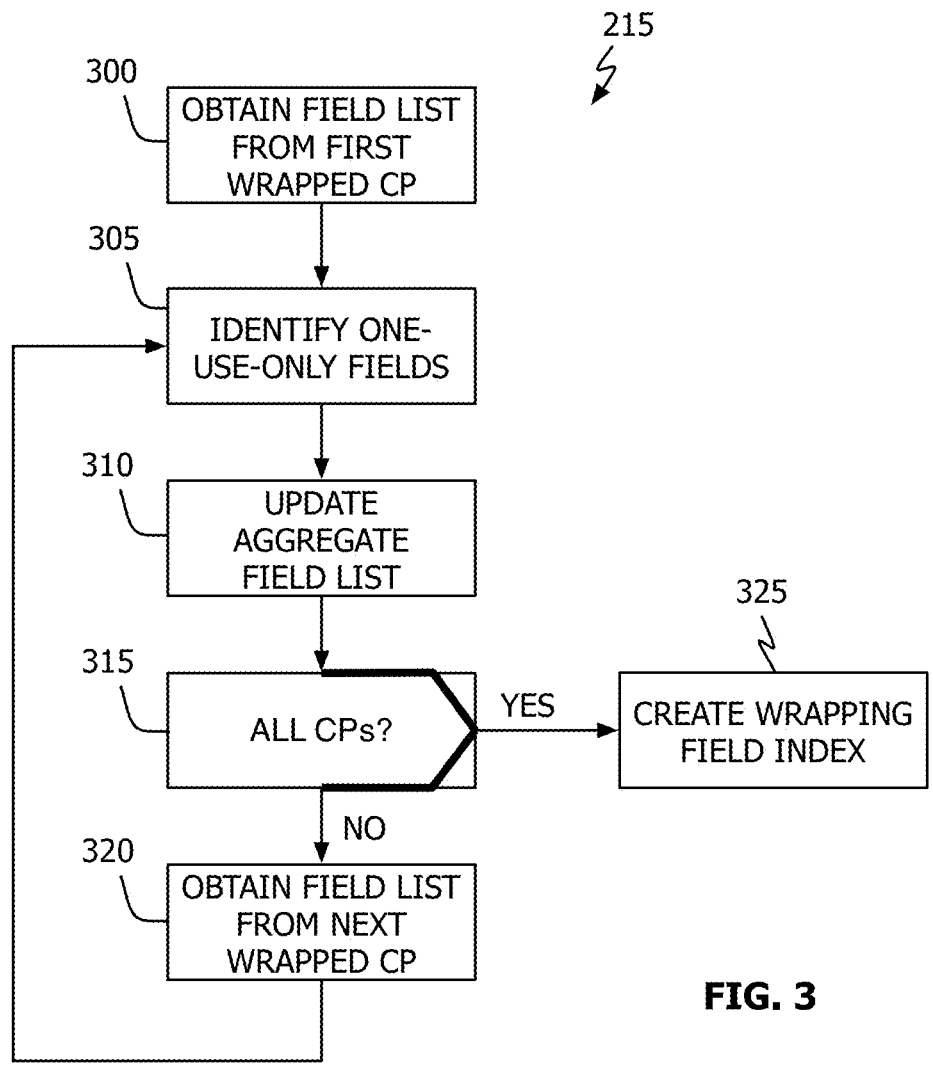
FIG. 3 illustrates, in flowchart form, a field mapping operation in accordance with one embodiment.

Referring to FIG. 3, mapping operation 215 identifies a first CP to be wrapped and determines how many fields each of its credentials contain and then enumerates through each field to obtain its associated field descriptor (block 300). In a Windows environment a field descriptor may contain a field's field identifier and field type. Illustrative fields include labels (e.g., a prompt beside an edit box), edit boxes (e.g., fields through which user data may be entered such as a user name or password), check boxes and radio buttons. It has been determined that some CP fields can only appear once in a CP implementing the IcredentialProvider interface; that is, interacting with the LogonUI process (e.g., the wrapping CP). Within the Windows Vista and Windows 7 environment, such one-use-only fields include fields of type CPFT_SUBMIT_BUTTON and CPFT_TILE_IMAGE. Accordingly, one-use-only fields may be identified (block 305).

The first CP's field list may be placed into the wrapping CP's aggregate field list which, until now, has been empty (block 310). It has also been found that, in a Windows environment, it is important to preserve the order of an individual wrapped CP's fields within the wrapping CP's aggregate field list (except for one-use-only fields, see discussion below). If the current CP is not the last CP to be wrapped (the "NO" prong of block 315), the next CP to be wrapped is identified and its field information is obtained as described above with respect to block 300 (block 320). Thereafter, operation 215 continues at block 305 where the current CP's one-use-only fields are identified, if it has any (block 305). As before, all one-use-only fields are identified and duplicates of those one-use-only fields previously identified are removed from the current CP's field list. Once all CPs to be wrapped have been interrogated and their fields included in the wrapping CP's aggregate field list (the "YES" prong of block 315), new field identifiers unique to the wrapping CP may be generated for each field in its aggregate field list (block 325). This mapping is done in such a way that the wrapping CP can relate a field in its aggregate field list (with single occurrences of one-use-only fields) back to a field from a source wrapped CP; converting from the wrapping CP's field identifier (that it is using to communicate about fields with the LogonUI process) back to the wrapped CP's field identifier (that the wrapped CP understands). In accordance with this disclosure, the wrapping CP's aggregate field list logically consists of the union of all the fields from each of the wrapped CPs—minus duplicates of one-use-only fields.

In the above embodiment, the wrapping CP implements the IcredentialProvider interface and contains instances of the wrapped CPs. The number of credentials available from the wrapping CP is the sum of the number of credentials available from the wrapped CPs. The wrapping CP gives each credential an unique index number and maps this index to a wrapped CP instance and credential index, enabling it to "pass through" calls from the LogonUI process to a specific wrapped CP in the context of the wrapped CP's own unique credential index numbers. Each instance of a credential (at a specific index number) in the wrapping CP implements the IcredentialProviderCredential interface and "wraps" an instance of the corresponding credential from the wrapped CP. Specifically, the wrapping CP's Advise method wraps its pointer to the IcredentialProviderCredentialEvents interface (in its Events object) and gives this object to the wrapped CP's Advise method. (In Windows Vista and Windows 7, the purpose of a CP object's Advise method is to give the CPs a mechanism for notifying LogonUI asynchronously of any desired change to the CP's visible UI elements.) The wrapping CP's Events object uses the field mapping information (see discussion above regarding FIG. 2 at element 225) to map field index numbers from the context of the wrapped CP back to the context of the wrapping CP when the wrapped CP calls LogonUI.

To illustrate some of the above operations, consider wrapping the two CPs whose credential and field information are shown in Table 1. As a preliminary matter, it should be noted that both CPs make use of one-use-only fields (e.g., submit button and image tile).

TABLE 1

| Illustrative Credential Providers to be Wrapped | | |
|---|---|---|
| Index | ID | Type |
| Wrapped CP-1 (2 credentials) | | |
| 0 | 10 | label |
| 1 | 20 | label |
| 2 | 30 | edit box |
| 3 | 40 | submit button |
| 4 | 50 | tile image |
| Wrapped CP-2 (1 credential) | | |
| 0 | 10 | label |
| 1 | 20 | edit box |
| 2 | 30 | submit button |
| 3 | 40 | tile image |

By interrogating each CP to be wrapped, the wrapping CP's initial mapping table may be as shown in Table 2. Note that the wrapping CP's credential count is the sum of the wrapped CPs' credentials. Note also that CP-2 is listed as having only 2 fields when in Table 1 it is shown as having 4. This is because two of CP-2's fields are one-use-only fields which were first found when working with CP-1. The information in Table 2 permits the wrapping CP to tell the LogonUI process how many credential tiles and how many fields the wrapping CP has. It also associates an index with each CP ("Provider Index"). In practice, the provider index may simply be the index of the CP entry in Table 2 (e.g., CP at row 0 has an implicit provider index of 0). Thus, the aggregate field list for the example wrapping CP contains 7 fields.

TABLE 2

Wrapped Providers Mapping Table.

| Provider | No. of Credentials | No. of Fields | CP Index |
|---|---|---|---|
| CP-1 | 2 | 5 | 0 |
| CP-2 | 1 | 2 | 1 |
| Total: | 3 | 7 | |

In one embodiment, the wrapping CP then generates a field index mapping table such as that shown in Table 3. This table provides a unique field index for the wrapping CP for every field in its aggregate field list (first column). The second column ("Wrapped CP Index") identifies each of the wrapping CP's fields with a unique wrapped CP. The third column ("Wrapped Field Index") associates an index for each field in the wrapping CP's aggregate field list with the corresponding field index in the wrapped CP's environment. For example, the field in the wrapping CP having the index 5 (first column) is associated with CP-2 (second column), and the field index in CP-2's environment itself is 0 (third column).

TABLE 3

Wrapping CP's Field Index Mapping.

| Wrapping Field Index | Wrapped CP Index | Wrapped Field Index |
|---|---|---|
| 0 | 0 | 0 |
| 1 | 0 | 1 |
| 2 | 0 | 2 |
| 3 | 0 | 3 |
| 4 | 0 | 4 |
| 5 | 1 | 0 |
| 6 | 1 | 1 |

Generation of mapping tables in accordance with this embodiment may be completed by taking into account one-use-only fields as illustrated in Table 4. As shown, one-use-only fields (i.e., the submit button and tile image fields) with wrapping CP identifiers 3 and 4 are used by both the wrapped CPs (CP-1 having a Wrapped CP Index of zero and CP-2 having a Wrapped CP Index of one). The mappings shown in Table 4 allow the wrapping CP to route requests from the LogonUI process by field identifier to the correct wrapped CP; translating the wrapping CP field identifier to the wrapped CP's identifier.

TABLE 4

Wrapping CP to Wrapped CP Field Identifier Mapping.

One-Use-Only Field Mappings

| Field Type | Wrapping Field ID |
|---|---|
| submit button | 3 |
| tile image | 4 |

| Wrapping Field ID | Wrapped CP Index | Wrapped Field ID |
|---|---|---|
| 0 | 0 | 10 |
| 1 | 0 | 20 |
| 2 | 0 | 30 |
| 3 | 0 | 40 |
| 4 | 0 | 50 |
| 5 | 1 | 10 |
| 6 | 1 | 20 |

TABLE 4-continued

Wrapping CP to Wrapped CP Field Identifier Mapping.

| | | |
|---|---|---|
| 3 | 1 | 30 |
| 4 | 1 | 40 |

By way of example, say the LogonUI process asks for the field descriptor at index 5. Using Table 3 ("Wrapping CP's Field Index Mapping") one finds that the request should be passed to CP-2 (the CP at index 1) as a request for the field at index zero ('0').

In another example, say the LogonUI process interacts with the wrapping credential that wraps a credential from CP-2 (the CP at index 1) to effect some change to field identifier 3. Using Table 4 ("Wrapping CP to Wrapped CP Field Identifier Mapping"), one can find that the wrapping CP's field identifier 3 for CP-2 maps to the wrapped CP's (i.e., CP-2) field identifier 30. With this translation complete, the wrapping CP can pass the request (identifying field identifier 30) to CP-2's credential.

In still another example, say the LogonUI process asks for the credential at index 2. Using Table 2 ("Wrapped Provider's Mapping") it may be determined that this request should be passed to the third credential as numbering in Tables 1-4 begins at '0'. This must be directed at CP-2 as the first two credentials come from CP-1. Further, this must be the credential at index 0 for CP-2 because CP-2 has only one credential. Thus, when the LogonUI process asks for the credential at index 2, the wrapping CP passes this request to the credential at index '0' of CP-2.

Figure 4:
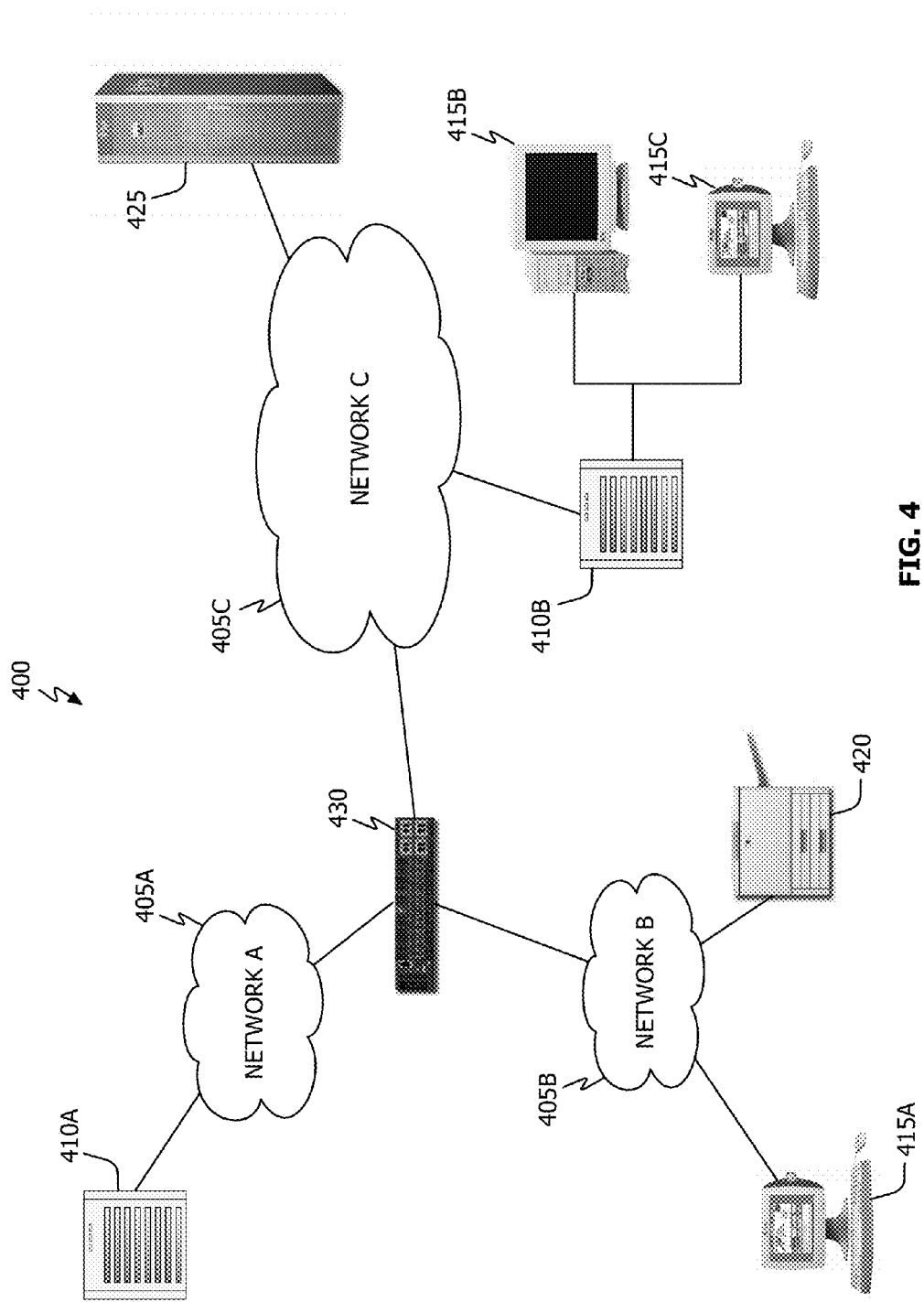
FIG. 4 shows, in block diagram form, a computer network in accordance with one embodiment.

Referring now to FIG. 4, illustrative network architecture 400 within which the disclosed techniques may be implemented includes a plurality of networks 405, (i.e., 405a, 405b and 405c), each of which may take any form including, but not limited to, a local area network (LAN) or a wide area network (WAN) such as the Internet. Further, networks 405 may use any desired technology (wired, wireless or a combination thereof) and protocol (e.g., transmission control protocol, TCP). Coupled to networks 405 are data server computers 410 (i.e., 410a and 410b) that are capable of communicating over networks 405. Also coupled to networks 405, and/or data server computers 410, are end-user computers 415 (i.e., 415a, 415b and 415c). In some embodiments, network architecture 410 may also include network printers such as printer 420 and storage systems such as 425. To facilitate communication between different network devices (e.g., data servers 410, end-user computers 415, network printer 420 and storage system 425), at least one gateway or router 430 may be optionally coupled there between.

Figure 5:
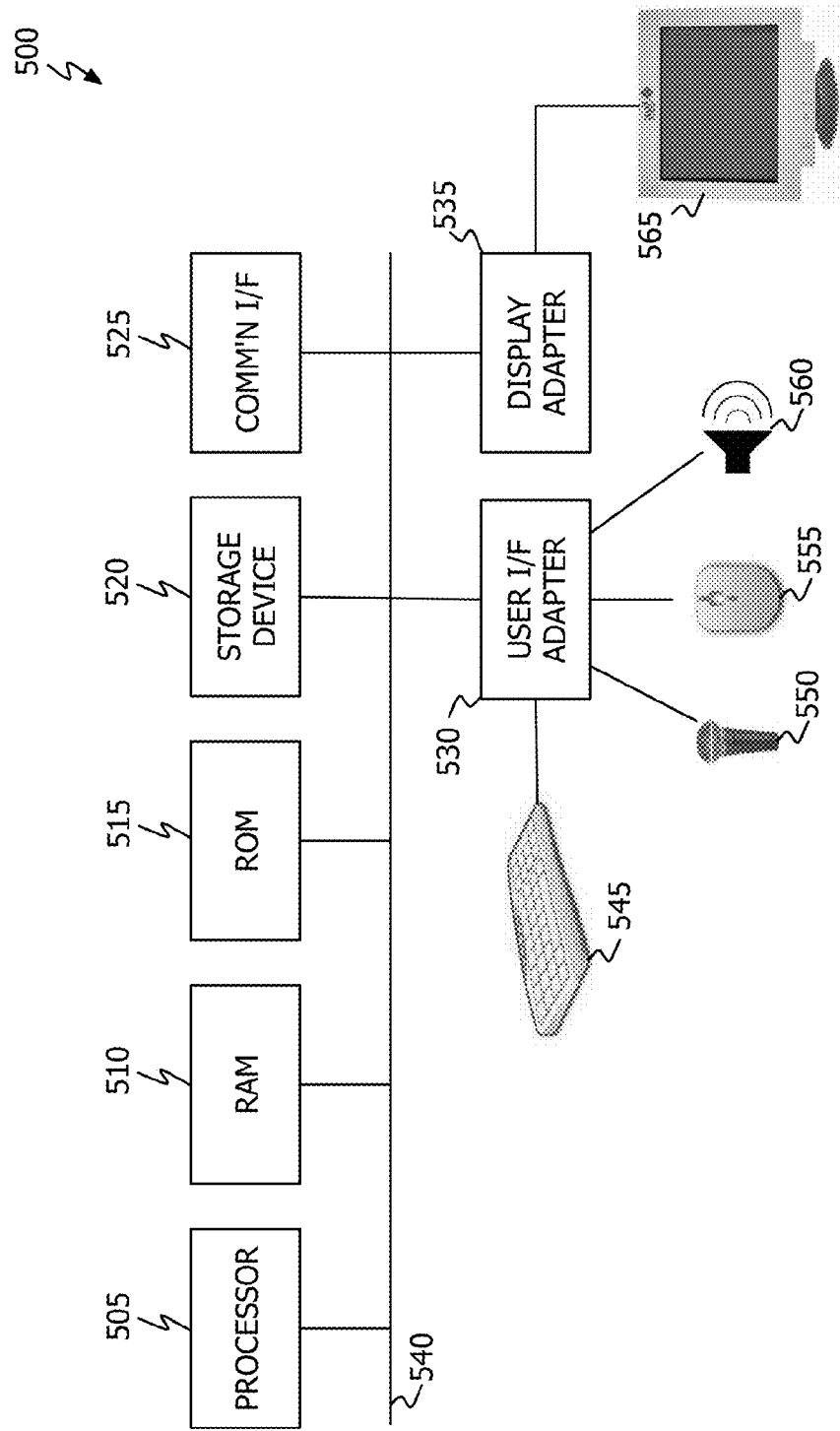
FIG. 5 shows, in block diagram form, an illustrative computer system that may be used to implement one or more operations in accordance with this disclosure.

Referring to FIG. 5, representative computer system 500 (e.g., data server 410 or end-user computer system 415) includes processor 505, random access memory (RAM) 510, read only memory (ROM) 515, storage device 520, communication interface 525 (for connection to a data network such as, for example, networks 405), user interface adapter 530 and display adapter 535—all of which may be coupled via system bus or backplane 540. User interface adapter 530 may be used for connecting keyboard 545, microphone 550, pointer device 555, speaker 560 and other user interface devices such as a touch-pad and/or a touch screen (not shown). Display adapter 535 may be used to connect display 565.

Processor 505 may include any programmable controller device including, for example, one or more members of the Intel Atom®, Core®, Pentium®, Celeron®, and Intel Core processor families from Intel Corporation and the Cortex and ARM processor families from ARM or custom designed state machines. (INTEL, INTEL ATOM, CORE, PENTIUM, CELERON and INTEL CORE are registered trademarks of the Intel Corporation. CORTEX is a registered trademark of the ARM Limited Corporation. ARM is a registered trademark of the ARM Limited Company.) Processor 505 may also be implemented as a custom designed state machine and may be embodied in a hardware device such as application specific integrated circuits (ASICs) and field programmable gate arrays (FPGAs).

Computer system 500 may have resident thereon any desired operating system. It will be appreciated that various embodiments of the techniques described herein may be implemented on platforms and operating systems other than those mentioned. One embodiment may be written using the JAVA®, C, and/or C++ language, or other programming languages. (JAVA is a registered trademark of Oracle America, Inc.)

Implementing credential provides as described herein permits several heterogeneous CPs to be wrapped in a single instance of a wrapper CP. This allows one CP instance (the wrapper CP) to be registered as implementing the IcredentialProvider interface. In addition, the wrapper CP can re-use the behavior and credentials of multiple (wrapped) CPs within LogonUI. Benefits of this approach include, but are not limited to: the static or dynamic discovery of CPs to wrap; the ability to wrap an unlimited number of CPs; the ability to extend the functionality of wrapped CPs without needing to communicate state between multiple instances of a wrapping CP; and a single sign-on facility that both requires only one credential to launch and allows the transition to, and reuse of, wrapped credentials.

Various changes in the materials, components, circuit elements, as well as in the details of the illustrated operational methods are possible without departing from the scope of the following claims. For instance, the disclosed methods may be performed by a programmable control device (e.g., processor 505) executing instructions organized into one or more program modules. The program modules may be stored in any suitable non-transitory memory/storage (e.g., memory 510 and/or 515 and/or 520). Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

I claim:

1. At least one non-transitory computer readable storage medium having instructions stored thereon that when the instructions are executed by one or more processors cause the one or more processors to:
   receive a wrapped credential provider containing information from a plurality of original credential providers, wherein each original credential provider has a specified number of credentials, an ordered list of fields wherein each field has an original credential provider specific identifier and each field has a descriptor;
   process the wrapped credential provider utilizing a map list from the ordered lists of fields from each original credential provider, wherein the order of fields from a single original credential provider is preserved in the map list and each subsequent instance of a one-use-only field in the map list contains a same unique identifier as was assigned to a first instance of the one-use-only field in the map list;
   identify a unique provider index to each of the plurality of original credential providers; and
   route requests from a logon interface process to a corresponding one of the plurality of original credential providers by translating a wrapping credential provider field identifier to an appropriate wrapped credential provider identifier.

2. The at least one computer readable storage medium of claim 1, wherein the wrapped credential provider was created based on a static list of original credential providers.

3. The at least one computer readable storage medium of claim 1, wherein the wrapped credential provider was created based on a run-time identification of original credential providers.

4. The at least one computer readable storage medium of claim 1, further comprising instructions that when executed by the one or more processors cause the one or more processors to:
   provide the logon interface process with a number of unique identifiers assigned to fields in the map list; and
   provide the logon interface process with a total number of credentials.

5. The at least one computer readable storage medium of claim 1, further comprising instructions that when executed by the one or more processors cause the one or more processors to provide the logon interface process with information sufficient for the logon interface process to display a plurality of tiles in a single window on a display device.

6. The at least one computer readable storage medium of claim 5, further comprising instructions that when executed by the one or more processors cause the one or more processors to:
   receive a request from the logon interface process for a field descriptor for a field having a specified index value;
   identify an entry in the map list having a unique identifier equal to the specified index value;
   obtain the field descriptor based on the entry in the map list; and
   provide the logon interface process with the field descriptor.

7. The at least one computer readable storage medium of claim 5, further comprising instructions that when executed by the one or more processors cause the one or more processors to:
   receive a request from the logon interface process to update a field having a field identifier;
   identify one of the plurality of original credential providers based on the request;
   identify a credential provider specific identifier for the field identifier for the one original credential provider based on an entry in the map list; and
   send, to the one original credential provider, a request to update a field in the one original credential provider identified by the credential provider specific identifier.

8. A method for controlling a computer logon environment comprising:
   receiving a wrapped credential provider containing information from a plurality of original credential providers, wherein each original credential provider has a specified number of credentials, an ordered list of fields wherein each field has an original credential provider specific identifier and each field has a descriptor;
   processing, by a processor of a computer system, the wrapped credential provider utilizing a map list from the ordered lists of fields from each original credential provider, wherein the order of fields from a single original credential provider is preserved in the map list and each subsequent instance of a one-use-only field in the map list contains a same unique identifier as was assigned to a first instance of the one-use-only field in the map list;

identifying, using the processor of the computer system, a unique provider index to each of the plurality of original credential providers; and routing requests from a logon interface process to a corresponding one of the plurality of original credential providers by translating a wrapping credential provider field identifier to an appropriate wrapped credential provider identifier.

9. The method of claim 8, wherein the wrapped credential provider was created based on a static list of original credential providers.

10. The method of claim 8, wherein the wrapped credential provider was created based on a run-time identification of original credential providers.

11. The method of claim 8, further comprising:
receiving, at the logon interface process, a number of unique identifiers assigned to fields in the map list; and
receiving, at the logon interface process, a total number of credentials.

12. The method of claim 8, further comprising:
receiving, at the logon interface process, information sufficient for the logon interface process to display a plurality of tiles in a single window on a display device.

13. The method of claim 12, further comprising:
receiving a request from the logon interface process for a field descriptor for a field having a specified index value;
identifying an entry in the map list having a unique identifier equal to the specified index value;
obtaining the field descriptor based on the entry in the map list; and
providing the logon interface process with the field descriptor.

14. The method of claim 12, further comprising:
receiving a request from the logon interface process to update a field having a field identifier;
identifying one of the plurality of original credential providers based on the request;
identifying a credential provider specific identifier for the field identifier for the one original credential provider based on an entry in the map list; and
sending, to the one original credential provider, a request to update a field in the one original credential provider identified by the credential provider specific identifier.

15. A programmable processing device comprising:
one or more processors; and
memory communicatively coupled to the one or more processors, wherein the memory stores instructions that when executed by the one or more processors cause the one or more processors to:
receive a wrapped credential provider containing information from a plurality of original credential providers, wherein each original credential provider has a specified number of credentials, an ordered list of fields wherein each field has an original credential provider specific identifier and each field has a descriptor;
process the wrapped credential provider utilizing a map list from the ordered lists of fields from each original credential provider, wherein the order of fields from a single original credential provider is preserved in the map list and each subsequent instance of a one-use-only field in the map list contains a same unique identifier as was assigned to a first instance of the one-use-only field in the map list;
identify a unique provider index to each of the plurality of original credential providers; and
route requests from a logon interface process to a corresponding one of the plurality of original credential providers by translating a wrapping credential provider field identifier to an appropriate wrapped credential provider identifier.

16. The programmable processing device of claim 15, wherein the wrapped credential provider was created based on a static list of original credential providers.

17. The programmable processing device of claim 15, wherein the wrapped credential provider was created based on a run-time identification of original credential providers.

18. The programmable processing device of claim 15, wherein the memory further stores instructions that when executed by the one or more processors cause the one or more processors to:
provide the logon interface process with a number of unique identifiers assigned to fields in the map list; and
provide the logon interface process with a total number of credentials.

19. The programmable processing device of claim 15, wherein the memory further stores instructions that when executed by the one or more processors cause the one or more processors to provide the logon interface process with information sufficient for the logon interface process to display a plurality of tiles in a single window on a display device.

20. The programmable processing device of claim 19, wherein the memory further stores instructions that when executed by the one or more processors cause the one or more processors to:
receive a request from the logon interface process for a field descriptor for a field having a specified index value;
identify an entry in the map list having a unique identifier equal to the specified index value;
obtain the field descriptor based on the entry in the map list; and
provide the logon interface process with the field descriptor.

21. The programmable processing device of claim 19, wherein the memory further stores instructions that when executed by the one or more processors cause the one or more processors to:
receive a request from the logon interface process to update a field having a field identifier;
identify one of the plurality of original credential providers based on the request;
identify a credential provider specific identifier for the field identifier for the one original credential provider based on an entry in the map list; and
send, to the one original credential provider, a request to update a field in the one original credential provider identified by the credential provider specific identifier.

* * * * *